United States Patent
Azuma et al.

(10) Patent No.: US 10,179,581 B2
(45) Date of Patent: Jan. 15, 2019

(54) HYBRID VEHICLE

(71) Applicant: TOYOTA JIDOSHA KABUSHIKI KAISHA, Toyota-shi, Aichi-ken (JP)

(72) Inventors: Hiroyuki Azuma, Toyota (JP); Tatsuki Saitoh, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 73 days.

(21) Appl. No.: 15/334,590

(22) Filed: Oct. 26, 2016

(65) Prior Publication Data

US 2017/0120893 A1    May 4, 2017

(30) Foreign Application Priority Data

Oct. 30, 2015    (JP) .................. 2015-213822

(51) Int. Cl.
  *B60W 20/14*    (2016.01)
  *B60W 10/08*    (2006.01)
  (Continued)

(52) U.S. Cl.
  CPC ............. *B60W 20/14* (2016.01); *B60K 6/445* (2013.01); *B60W 10/06* (2013.01); *B60W 10/08* (2013.01); *B60W 20/10* (2013.01); *B60W 30/18109* (2013.01); *B60W 30/18127* (2013.01); *B60W 30/18136* (2013.01); *F01L 1/34* (2013.01); *F01L 13/02* (2013.01); *B60W 2510/244* (2013.01); *B60W 2540/10* (2013.01); *B60W 2540/16* (2013.01); *B60Y 2200/92* (2013.01); *B60Y 2300/18125* (2013.01); *B60Y 2300/18133* (2013.01); *B60Y 2300/91* (2013.01);
  (Continued)

(58) Field of Classification Search
  None
  See application file for complete search history.

(56) References Cited

U.S. PATENT DOCUMENTS

2006/0289210 A1* 12/2006 Yoshimi ............... B60K 6/26
                                                180/65.245
2010/0130321 A1*  5/2010 Eto ..................... B60K 6/365
                                                       475/5
(Continued)

FOREIGN PATENT DOCUMENTS

| JP | 2005-2812   | 1/2005  |
| JP | 2009-280026 | 12/2009 |
| JP | 2015-58828  | 3/2015  |

*Primary Examiner* — Todd M Melton
*Assistant Examiner* — Jason R Roberson
(74) *Attorney, Agent, or Firm* — Finnegan, Henderson, Farabow, Garrett & Dunner, LLP (57) ABSTRACT

In a hybrid vehicle configured such that a sun gear, a carrier and a ring gear of a planetary gear are respectively connected with a rotating shaft of a motor MG1, a crankshaft of an engine and a driveshaft and that a motor MG2 is connected with the driveshaft, when a required braking force that is to be output to the driveshaft is equal to or less than a reference value Tref in an accelerator-off state, the braking force by engine braking is output to the driveshaft by motoring of the engine by the motor MG1. When the required braking force becomes greater than the reference value Tref, on the other hand, the power output from the engine by load operation of the engine in a reverse rotating direction is output as the braking force to the driveshaft.

3 Claims, 9 Drawing Sheets

(51) Int. Cl.

| | |
|---|---|
| *B60W 30/18* | (2012.01) |
| *B60W 10/06* | (2006.01) |
| *B60K 6/445* | (2007.10) |
| *F01L 1/34* | (2006.01) |
| *F01L 13/02* | (2006.01) |
| *B60W 20/10* | (2016.01) |

(52) U.S. Cl.
CPC ...... *B60Y 2400/112* (2013.01); *Y02T 10/6239* (2013.01); *Y02T 10/6286* (2013.01); *Y10S 903/91* (2013.01); *Y10S 903/947* (2013.01)

(56) References Cited

U.S. PATENT DOCUMENTS

| | | | |
|---|---|---|---|
| 2010/0180844 A1* | 7/2010 | Uehama | F01L 1/022 123/90.17 |
| 2014/0129067 A1* | 5/2014 | Furukawa | B60K 6/442 701/22 |
| 2015/0014072 A1* | 1/2015 | Maruyama | B60K 6/445 180/65.23 |
| 2015/0081151 A1 | 3/2015 | Asami et al. | |
| 2015/0377158 A1* | 12/2015 | Benjey | F02B 39/10 701/22 |

* cited by examiner

(a) DURING NORMAL ROTATION

Fig. 3a (b) DURING REVERSE ROTATION

HYBRID VEHICLE

CROSS-REFERENCE TO RELATED APPLICATIONS

The present disclosure claims priority to Japanese Patent Application No. 2015-213822 filed Oct. 30, 2015, which is incorporated herein by reference in its entirety including specification, drawings and claims.

TECHNICAL FIELD

The present disclosure relates to a hybrid vehicle and more specifically relates to a hybrid vehicle equipped with an engine, a first motor, a planetary gear mechanism, a second motor and a secondary battery.

BACKGROUND ART

A hybrid vehicle equipped with an engine, motors MG1 and MG2, a power distribution device and a battery has been proposed (for example, Patent Literature 1). This hybrid vehicle is configured to decrease the lift amount or the working angle of an intake valve of the engine during regenerative control by the motor MG2, so as to increase the force by engine braking.

CITATION LIST

Patent Literature

PTL 1: JP 2015-58828A

SUMMARY

Technical Problem

Decreasing the lift amount or the working angle of the intake valve, however, has limitation in the obtained braking force. When a large required braking force is required, the obtained braking force is thus unlikely to meet the required braking force.

An object of the hybrid vehicle of the disclosure is mainly to more reliably output a required braking force to a driveshaft.

Solution to Problem

In order to achieve the above object, the hybrid vehicle of the disclosure may be implemented by the following aspect.

The present disclosure is directed to a hybrid vehicle. The hybrid vehicle includes an engine, a first motor, a planetary gear mechanism configured to include a first rotational element, a second rotational element and a third rotational element that are arranged in this sequence on a collinear diagram, such that the first rotational element is connected with a rotating shaft of the first motor, the second rotational element is connected with an output shaft of the engine, and the third rotational element is connected with a driveshaft that is linked with an axle, a second motor configured to cause power to be input from and output to the driveshaft, and a secondary battery configured to transmit electric power to and from the first motor and the second motor, wherein power is output from the engine to the second rotational element both in a normal rotating direction and in a reverse rotating direction. The hybrid vehicle further includes a braking controller configured to perform braking control when a required braking force that is to be output to the driveshaft is greater than a predetermined braking force. The braking control controls the engine and the first motor such as to cause a power in the reverse rotating direction to be output from the engine to the second rotational element and to be transmitted to the driveshaft, while controlling the second motor such as to cause the required braking force to be output to the driveshaft.

The hybrid vehicle of this aspect includes the engine; the first motor; the planetary gear mechanism including the first rotational element that is connected with the rotating shaft of the first motor, the second rotational element that is connected with the output shaft of the engine, and the third rotational element that is connected with the driveshaft; the second motor configured to output power to the driveshaft; and the secondary battery, and is configured to enable the power both in the normal rotating direction and in the reverse rotating direction to be output from the engine to the second rotational element. When the required braking force that is to be output to the driveshaft is greater than the predetermined braking force, the hybrid vehicle performs the braking control that controls the engine and the first motor such as to cause the power in the reverse rotating direction to be output from the engine to the second rotational element and to be transmitted to the driveshaft, while controlling the second motor such as to cause the required braking force to be output to the driveshaft. This braking control enables the power in the reverse rotating direction output from the engine to the second rotational element to be transmitted as the braking force to the driveshaft. This configuration accordingly enables a larger braking force to be output to the driveshaft, compared with a configuration of motoring the engine by the first motor in the state that fuel supply to the engine is stopped. As a result, this enables the required braking force to be more reliably output to the driveshaft.

DESCRIPTION OF EMBODIMENTS

The following describes some aspects of the disclosure with reference to an embodiment.

Figure 1:
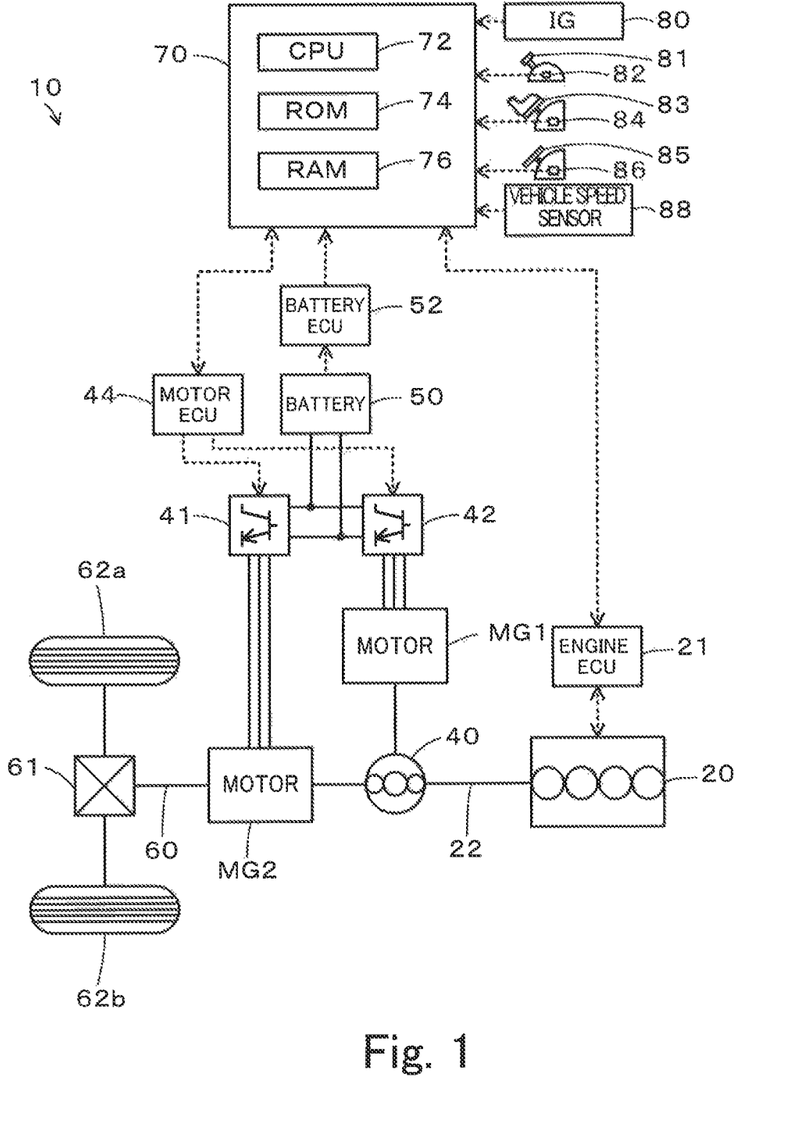
FIG. 1 is a configuration diagram illustrating the schematic configuration of a hybrid vehicle according to one embodiment of the disclosure.
Figure 2:
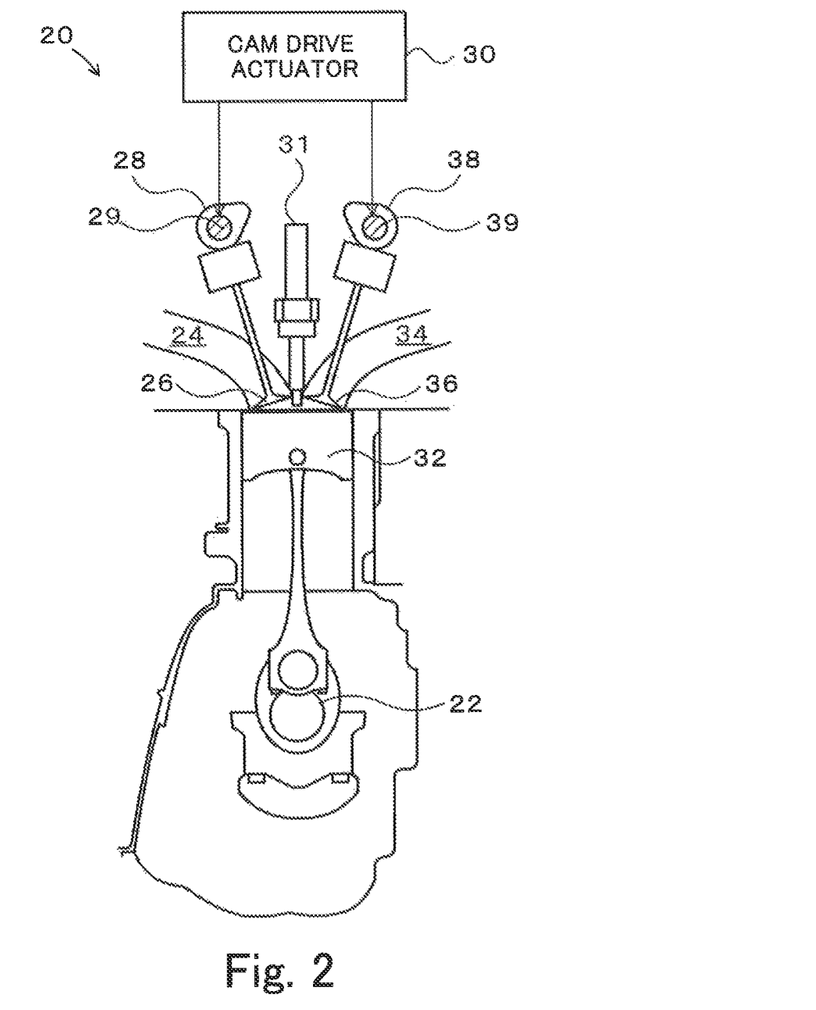
FIG. 2 is a configuration diagram illustrating the schematic configuration of an engine.

FIG. 1 is a configuration diagram illustrating the schematic configuration of a hybrid vehicle 10 according to one embodiment of the disclosure. FIG. 2 is a configuration diagram illustrating the schematic configuration of an engine 20. As illustrated, the hybrid vehicle 10 of the embodiment includes an engine 20, a planetary gear 40, a motor MG1, a motor MG2, inverters 41 and 42, a battery 50 and a hybrid electronic controller (hereinafter referred to as HVECU) 70.

The engine 20 is provided as an internal combustion engine to output power using, for example, gasoline or light oil as the fuel and is under operation control of an engine electronic controller (hereinafter referred to as engine ECU) 21. The engine 20 is configured as a four-cycle engine having intake, compression, expansion and exhaust strokes. As shown in FIG. 2, the air taken into an intake pipe 24 (intake) via a throttle valve (not shown) is mixed with the fuel injected from a fuel injection valve (not shown) into the intake pipe 24. The air-fuel mixture is taken into a combustion chamber via an intake valve 26, is compressed and is explosively combusted with an electric spark generated by an ignition plug 31. The reciprocating motion of a piston 32 pressed down by the energy of combustion is converted into rotating motion of a crankshaft 22, so as to output power. The exhaust gas after the combustion is supplied to an exhaust pipe 34 via an exhaust valve 36, is converted into less toxic components by a catalytic converter (not shown) provided in the exhaust pipe 34 and is then discharged to the outside air.

The intake valve 26 is actuated to be opened and closed by a cam 28 attached to a cam shaft 29. The exhaust valve 36 is actuated to be opened and closed by a cam 38 attached to a cam shaft 39. The rotation of the crank shaft 22 is transmitted via a timing chain (not shown) to the cam shaft 29 or 39, so as to rotate the cam shaft 29 or 39 at a rate of one rotation per two rotations of the crankshaft 22.

The phase of the cam 28 relative to the cam shaft 29 may be adjusted, for example, such as to open the intake valve 26 at a timing before the piston 32 reaches a top dead center in the end of the exhaust stroke and close the intake valve 26 after the piston 32 has passed through a bottom dead center thereof. The phase of the cam 38 relative to the cam shaft 39 may be adjusted, for example, such as to open the exhaust valve 36 at a timing before the piston 32 reaches a bottom dead center in the end of the combustion stroke and close the exhaust valve 36 after the piston 32 has passed through a top dead center thereof. The phases of the cams 28 and 38 may be changed by a cam drive actuator 30. The cam drive actuator 30 may have, for example, a configuration described in JP 2005-02812A.

The ignition plug 31 generates an electric spark, in response to output of a drive signal to an ignition coil integrated with an igniter. The ignition timing of the ignition plug 31 may be adjusted to, for example, a timing before the piston 32 reaches a top dead center in the end of the compression stroke.

Figure 3A:
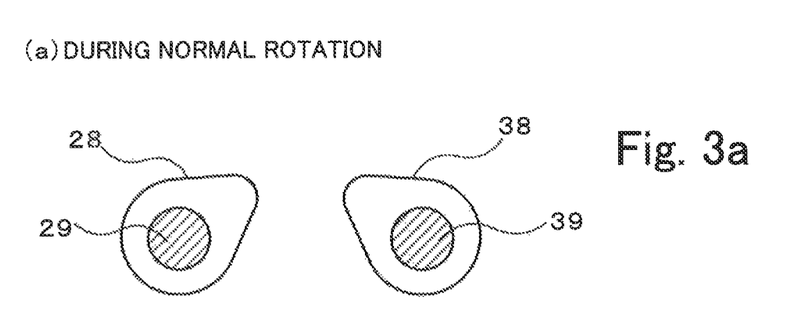
FIG. 3a/3b is a diagram illustrating phases for normal rotation and phases for reverse rotation of cams.
Figure 3B:
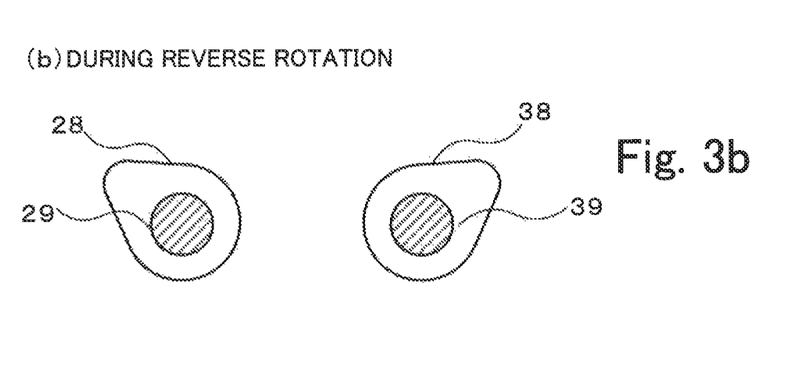

The engine 20 of the embodiment having the above configuration enables power to be output in both a normal rotating direction and a reverse rotating direction by changing the phases of the cams 28 and 38 and the ignition timing of the ignition plug 31. As described above, the engine 20 is a four-cycle engine, and the rotation angles of the crankshaft 22 at the opening timings and the closing timings of the intake valve 26 and the exhaust valve 36 described above during normal rotation differ from those during reverse rotation. Accordingly, as shown in FIG. 3, the opening timings and the closing timings of the intake valve 26 and the exhaust valve 36 may be adjusted to the optimal timings both in the normal rotating direction and in the reverse rotating direction, for example, by changing over the phases of the cams 28 and 38 between during normal rotation and during reverse rotation. The rotation angle of the crankshaft 22 at the ignition timing of the ignition plug 31 described above during normal rotation also differs from that during reverse rotation. Accordingly, the ignition timing may be adjusted to the optimal timing both in the normal rotating direction and in the reverse rotating direction, for example, by changing over the ignition timing between during normal rotation and during reverse rotation.

The engine ECU 21 is configured as a CPU-based microprocessor and includes a ROM that stores processing programs, a RAM that temporarily stores data, input and output ports and a communication port other than the CPU, although not being illustrated. Signals from various sensors required for operation control of the engine 20 are input into the engine ECU 21 via the input port. Various control signals for operation control of the engine 20 are output from the engine ECU 21 via the output port. The engine ECU 21 computes a rotation speed Ne of the engine 20, based on a signal from a crank position sensor (not shown) attached to the crankshaft 22 of the engine 20.

The planetary gear 40 is configured as a single pinion-type planetary gear mechanism. The planetary gear 40 includes a sun gear, a carrier and a ring gear that are respectively connected with a rotor of the motor MG1, the crankshaft 22 of the engine 20, and a driveshaft 60 that is linked with drive wheels 62a and 62b via a differential gear 61.

The motor MG1 is configured as a synchronous motor generator and includes the rotor that is connected with the sun gear of the planetary gear 40 as described above. The motor MG2 is configured as a synchronous motor generator and includes a rotor connected with the driveshaft 60. The motors MG1 and MG2 are driven by converting DC power from the battery 50 into three-phase AC power and supplying the converted AC power through switching control of switching elements (not shown) included in the inverters 41 and 42 by a motor electronic controller (hereinafter referred to as motor ECU) 44.

The motor ECU 44 is configured as a CPU-based microprocessor and includes a ROM that stores processing programs, a RAM that temporarily stores data, input and output ports and a communication port other than the CPU, although not being illustrated. Signals required for drive control of the motors MG1 and MG2 are input into the motor ECU 44 via the input port. For example, rotational positions θm1 and θm2 from rotational position detection sensors (not shown) configured to detect the rotational positions of the rotors of the motors MG1 and MG2 and phase currents provided to be applied to the motors MG1 and MG2 and detected by current sensors (not shown) are input into the motor ECU 44 via the input port. Switching control signals to the switching elements (not shown) of the inverters 41 and 42 and the like are output from the motor ECU 44 via the output port. The motor ECU 44 communicates with the HVECU 70 and drives and controls the motors MG1 and MG2 in response to control signals from the HVECU 70, while sending data regarding the operating conditions of the motors MG1 and MG2 to the HVECU 70 as needed. The motor ECU 44 also computes rotation speeds Nm1 and Nm2 of the motors MG1 and MG2, based on the rotational positions θm1 and θm2 of the rotors of the motors MG1 and MG2 from the rotational position detection sensors.

The battery 50 is configured as, for example, a lithium ion secondary battery to transmit electric power to and from the motors MG1 and MG2 via the inverters 41 and 42. The battery 50 is under management of a battery electronic controller (hereinafter referred to as battery ECU) 52. The battery ECU 52 is configured as a CPU-based microprocessor and includes a ROM that stores processing programs, a RAM that temporarily stores data, input and output ports and a communication port other than the CPU, although not being illustrated. Signals required for management of the battery 50 are input into the battery ECU 52 via the input port. For example, an inter-terminal voltage Vb from a voltage sensor (not shown) placed between terminals of the battery 50, a charge-discharge current Ib from a current sensor (not shown) attached to a power line connected with an output terminal of the battery 50 and a battery temperature Tb from a temperature sensor (not shown) attached to the battery 50 are input into the battery ECU 52. The battery ECU 52 computes a state of charge SOC that denotes a ratio of the capacity of electric power dischargeable from the battery 50 at the moment to the total capacity, based on an integrated value of the charge-discharge current Ib at the moment detected by the current sensor. The battery ECU 52 also computes an input limit Win and an output limit Wout that denote maximum allowable electric powers to be charged into the battery 50 and to be discharged from the battery 50, based on the computed state of charge SOC and the battery temperature Tb. The battery ECU 52 communicates with the HVECU 70 and sends data regarding the conditions of the battery 50 to the HVECU 70 as needed.

The HVECU 70 is configured as a CPU 72-based microprocessor and includes a ROM 74 that stores processing programs, a RAM 76 that temporarily stores data, input and output ports and a communication port other than the CPU 72. For example, an ignition signal from an ignition switch 80, a shift range SR from a shift position sensor 82 configured to detect the operation position of a gearshift 81, an accelerator position Acc from an accelerator position sensor 84 configured to detect the driver's depression amount of an accelerator pedal 83, a brake pedal position BP from a brake pedal position sensor 86 configured to detect the driver's depression amount of a brake pedal 85 and a vehicle speed V from a vehicle speed sensor 88 are input into the HVECU 70 via the input port. The HVECU 70 is connected such as to be communicable with the engine ECU 21, the motor ECU 44 and the battery ECU 52 and transmits various control signals and data to and from the engine ECU 21, the motor ECU 44 and the battery ECU 52.

The hybrid vehicle 10 of the embodiment having the above configuration computes a required torque Tp* that is to be output to the driveshaft 60, based on the vehicle speed V and the accelerator position Acc corresponding to the driver's depression amount of the accelerator pedal 83, and performs operation control of the engine 20, the motor MG1 and the motor MG2 such as to cause a required power corresponding to the computed required torque Tp* to be output to the driveshaft 60. The operation control of the engine 20, the motor MG1 and the motor MG2 is performed in one of the following three modes (1) to (3). In both (1) torque conversion drive mode and (2) charge-discharge drive mode, the engine 20 and the motors MG1 and MG2 are controlled accompanied with operation of the engine 20 such as to cause a required power to be output to the driveshaft 60. There is accordingly no significant difference in the substantial control between these two modes (1) and (2), so that these two modes (1) and (2) are collectively called engine drive mode (hybrid mode) in the description below.

(1) Torque conversion drive mode: In this drive mode, the engine 20 is operated and controlled such as to cause a power corresponding to a required power to be output from the engine 20, while the motors MG1 and MG2 are driven and controlled such as to cause the entire power output from the engine 20 to be subjected to torque conversion by the planetary gear 40, the motor MG1 and the motor MG2 and to be output to the driveshaft 60.

(2) Charge-discharge drive mode: In this drive mode, the engine 20 is operated and controlled such as to cause a power corresponding to the sum of a required power and an electric power required to be charged into the battery 50 or to be discharged from the battery 50 to be output from the engine 20, while the motors MG1 and MG2 are driven and controlled such as to cause the entire power or part of the power output from the engine 20 accompanied with charging or discharging the battery 50 to be subjected to torque conversion by the planetary gear 40, the motor MG1 and the motor MG2 and cause the required power to be output to the driveshaft 60.

(3) Motor drive mode: In this drive mode, the motor MG2 is driven and controlled to cause a power corresponding to a required power to be output to the driveshaft 60, while the operation of the engine 20 is stopped.

The following describes a concrete procedure of the control in the engine drive mode (hybrid mode). The HVECU 70 computes a driving power Pdrv* that is required for driving by multiplying the required torque Tp* that is set according to the accelerator position Acc and the vehicle speed V by a rotation speed Nr of the driveshaft 60 (rotation speed obtained by, for example, multiplying the rotation speed Nm2 of the motor MG2 or the vehicle speed V by a conversion factor). The HVECU 70 subsequently sets an engine required power Pe* required for the engine 20 by subtracting a charge-discharge required power Pb* of the battery 50 that is determined based on the state of charge SOC of the battery 50 (Pb* provides a positive value in the case of discharging the battery 50) from the calculated driving power Pdrv*. The HVECU 70 then sets a target operation point (operating point) of the engine 20 defined by a target rotation speed Ne* and a target torque Te*, based on the engine required power Pe*. The target operation point of the engine 20 (i.e., the target rotation speed Ne* and the target torque Te*) may be determined as an intersection of the engine required power Pe* with an operation line of the engine 20 (operation line for fuel consumption) that enables the engine required power Pe* to be output from the engine 20 with high efficiency. The HVECU 70 subsequently sets a torque command Tm1* of the motor MG1 by rotation speed feedback control that controls the rotation speed Ne of the engine 20 to the target rotation speed Ne* in a range specified by the input limit Win and the output limit Wout of the battery 50, and sets a torque command Tm2* of the motor MG2 such as to cause the required torque Tp* to be output to the driveshaft 60. The HVECU 70 sends the settings of the target rotation speed Ne* and the target torque Te* of the engine 20 to the engine ECU 21, while sending the settings of the torque commands Tm1* and Tm2* of the motors MG1 and MG2 to the motor ECU 44. When receiving the target rotation speed Ne* and the target torque Te*, the engine ECU 21 performs intake air flow control, fuel injection control and ignition control of the engine 20, such as to operate the engine 20 with the target rotation speed Ne* and the target torque Te*. When receiving the torque commands Tm1* and Tm2*, the motor ECU 44 performs switching control of the switching elements of the inverters 41 and 42, such as to drive the motors MG1 and MG2 with the torque commands Tm1* and Tm2*.

The following describes a concrete procedure of the control in the motor drive mode. The HVECU 70 sets the torque command Tm2* of the motor MG2 such as to cause the required torque Tp* that is set according to the accelerator position Acc and the vehicle speed V to be output to the driveshaft 60 in the range defined by the input limit Win and the output limit Wout of the battery 50, and sends the set torque command Tm2* to the motor ECU 44. When receiving the torque command Tm2*, the motor ECU 44 performs switching control of the switching elements of the inverter 42, such as to drive the motor MG2 with the torque command Tm2*.

Shift positions SP of the gearshift 81 provided in the hybrid vehicle 10 of the embodiment include a parking position (P position) used during parking, a reverse position (R position) for reverse driving, a neural position (N position) for neutral gear and a general drive position (D position) for forward driving, and additionally include a brake position (B position) in which the braking force set to be applied in an accelerator-off state during driving is greater than the braking force at the D position, while the driving force set in an accelerator-on state is equal to the driving force at the D position, and a sequential shift position (S position) having an upshift instruction position and a downshift instruction position. At the S position, the driving force in the accelerator-on state and the braking force in the accelerator-off state during driving may be changed over, for example, among four stages (S1 to S4). Every time the upshift instruction position is operated for an upshift, the driving force in the accelerator-on state and the braking force in the accelerator-off state during driving are decreased. Every time the downshift instruction position is operated for a downshift, on the other hand, the driving force in the accelerator-on state and the braking force in the accelerator-off state during driving are increased.

Figure 4:
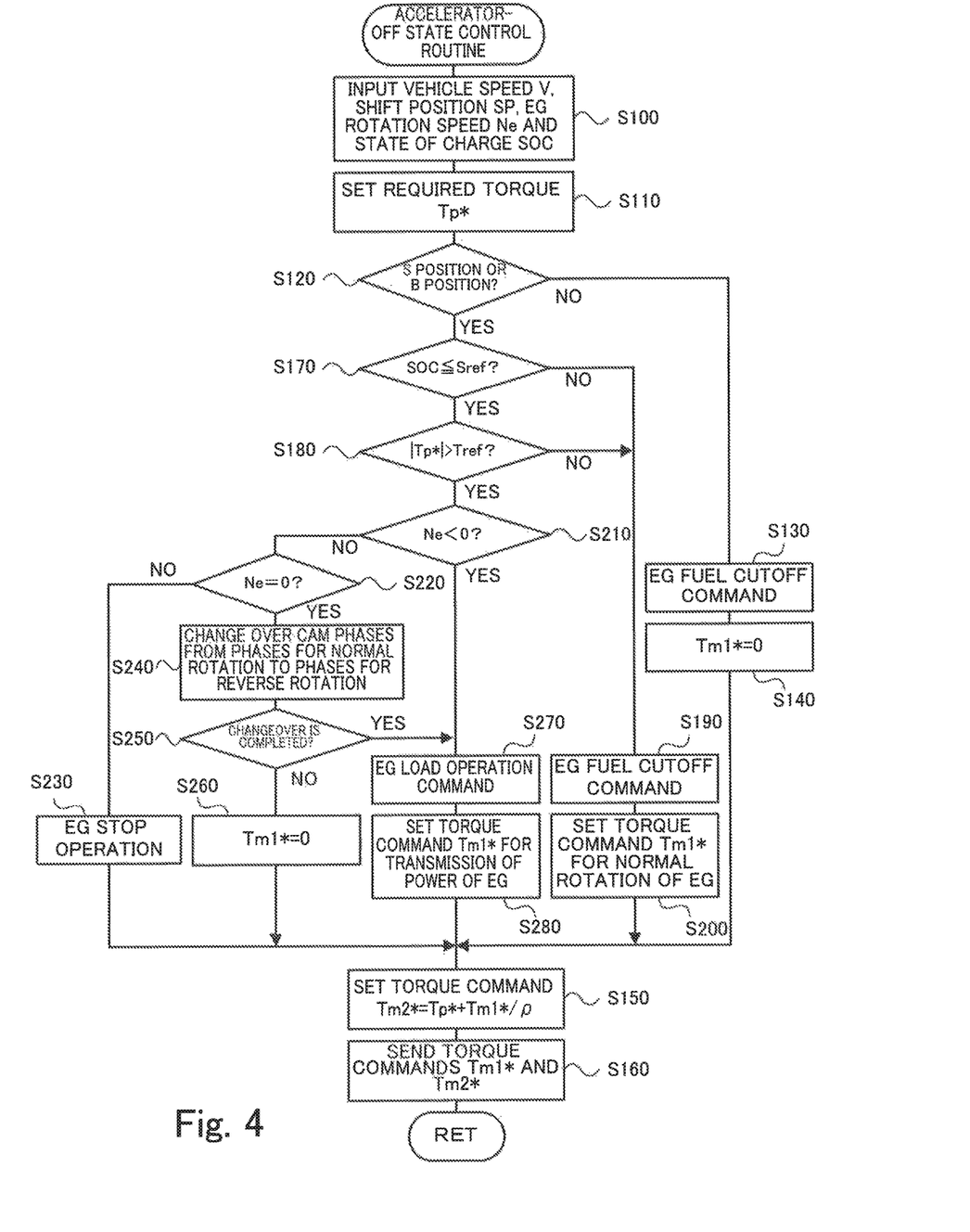
FIG. 4 is a flowchart showing one example of an accelerator-off state control routine.

The following describes the operations of the hybrid vehicle 10 of the embodiment configured as described above or more specifically a series of operations to decelerate the hybrid vehicle 10 in an accelerator-off state during forward driving. FIG. 4 is a flowchart showing one example of an accelerator-off state control routine performed by the CPU 72 of the HVECU 70. This routine is repeatedly performed at predetermined time intervals (for example, every several msec) when the accelerator position Acc detected by the accelerator position sensor 84 is approximately equal to 0.

On the start of the accelerator-off state control routine, the CPU 72 of the HVECU 70 first receives the inputs of, for example, the vehicle speed V from the vehicle speed sensor 88, the shift position SP from the shift position sensor 82, the engine rotation speed Ne and the state of charge SOC (S100). The engine rotation speed Ne is computed by the engine ECU 21 based on the signal detected by the crank position sensor and is input by communication. The state of charge SOC is computed by the battery ECU 52 based on the integrated value of the charge-discharge current Ib and is input by communication.

Figure 5:
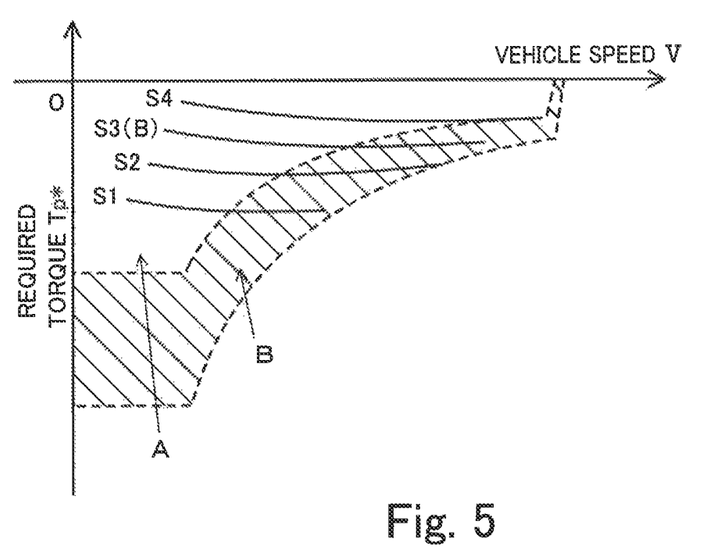
FIG. 5 is a diagram illustrating one example of a required torque setting map.

The CPU 72 subsequently sets a required torque Tp* that is to be output to the driveshaft 60, based on the input vehicle speed V and the input shift position SP (S110). A procedure of setting the required torque Tp* provides and stores in advance a relationship of the required torque Tp* to the vehicle speed V and the shift position SP in the form of a map in the ROM 74 and reads a required torque Tp* corresponding to a given vehicle speed V and a given shift position SP from the map. One example of the required torque setting map is shown in FIG. 5. The positive value of the required torque Tp* indicates the driving force, and the negative value of the required torque Tp* indicates the braking force. An area A shown in FIG. 5 represents an area of possible deceleration when the braking force by engine braking is output to the driveshaft 60. An area B shown in FIG. 5 represents an area of possible deceleration when the power in the reverse rotating direction from the engine 20 is output as the braking force to the driveshaft 60. The details will be described later.

The CPU 72 subsequently determines whether the input shift position SP is either the B position or the S position (S1 to S4) (S120). When the input shift position SP is determined to be neither the B position nor the S position but to be, for example, the D position or the N position, the CPU 72 sends a fuel cutoff command to the engine ECU 21 to stop fuel supply to the engine 20 (S130) and sets value 0 to the torque command Tm1* that is to be output from the motor MG1 (S140). The CPU 72 then sets the torque command Tm2* (=Tp*) that is to be output from the motor MG2, so as to cause the required torque Tp* to be output to the driveshaft 60 (S150), sends the settings of the torque commands Tm1* and Tm2* to the motor ECU 44 (S160) and terminates the accelerator-off state control routine. When receiving the torque commands Tm1* and Tm2*, the motor ECU 44 performs switching control of the inverters 41 and 42, such as to cause a torque corresponding to the torque command Tm1* to be output from the motor MG1 and cause a torque corresponding to the torque command Tm2* to be output from the motor MG2. As described above, at the shift position SP that is the D position, a required braking force is output to the driveshaft 60 by regenerative control of the motor MG2. Even at the shift position SP that is the D position, depending on the magnitude of the required braking force, a control may be performed to cause the braking force by engine braking to be output to the driveshaft 60. At the shift position SP that is the N position, the required torque Tp* is equal to value 0, so that the torque command Tm2* is set to value 0. The hybrid vehicle 10 is accordingly driven by inertial drive.

When it is determined at S120 that the shift position SP is either the B position or the S position, on the other hand, the CPU 72 sequentially determines whether the state of charge SOC is equal to or less than a reference value Sref (S170) and determines whether an absolute value of the required torque Tp* (required braking force) is greater than a reference value Tref (S180). The reference value Sref denotes a threshold value used to determine whether the battery 50 still has a vacant capacity to be chargeable and may be set to, for example, 60%. The reference value Tref denotes a threshold value used to determine whether the braking force by engine braking meets the required braking force. More specifically, the reference value Tref denotes a boundary value between the area A and the area B shown in FIG. 5 and is set according to the vehicle speed V. When it is determined that the state of charge SOC is neither equal to nor less than the reference value Sref or when it is determined that the absolute value of the required torque Tp* (required braking force) is not greater than the reference value Tref, the CPU 72 sends a fuel cutoff command to the engine ECU 21 (S190) and sets a torque required for motoring the engine 20 in the normal rotating direction to the torque command Tm1* of the motor MG1 (S200). The CPU 72 subsequently sets the torque command Tm2* (=Tp*+Tm1*/ρ) that is to be output from the motor MG2, based on the required torque Tp* and the torque command Tm1*, such as to cause the required torque Tp* to be output to the driveshaft 60 (S150), sends the settings of the torque commands Tm1* and Tm2* to the motor ECU 44 (S160) and terminates the accelerator-off state control routine. As described above, at the shift position SP that is either the B position or the S position, when the required braking force is equal to or less than the reference value Tref, the braking force by engine braking is output to the driveshaft 60 by forcible motoring of the engine 20 by the motor MG1 in the state that fuel supply to the engine 20 is stopped.

Figure 6:
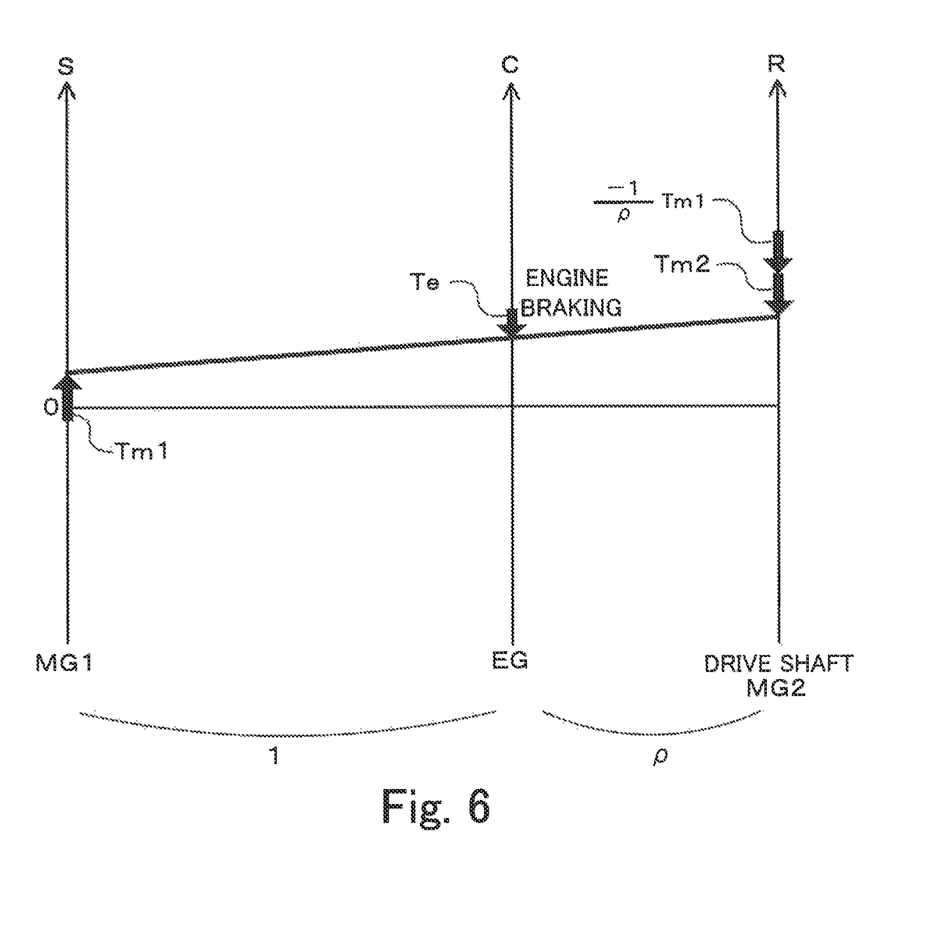
FIG. 6 is a collinear diagram illustrating a dynamic relationship between rotation speed and torque with regard to respective rotational elements of a planetary gear during deceleration driving by engine braking.

FIG. 6 is a collinear diagram illustrating a dynamic relationship between the rotation speed and the torque with regard to the respective rotational elements of the planetary gear 40 during deceleration driving by engine braking. An S axis on the left shows the rotation speed of the sun gear that is equal to the rotation speed of the motor MG1. An axis C in the middle shows the rotation speed of the carrier that is equal to the rotation speed of the engine 20. An axis R on the right shows the rotation speed of the ring gear that is equal to the rotation speed of the driveshaft 60. Thick arrows on the axis R indicate a braking torque (−Tm1/ρ) that is applied to the driveshaft 36 by the torque output from the motor MG1 for motoring the engine 20 and a braking torque Tm2 output from the motor MG2. As illustrated, motoring the engine 20 by the torque output from the motor MG1 causes the braking force by engine braking to be output to the driveshaft 60 for deceleration driving.

When it is determined at S170 that the state of charge SOC is equal to or less than the reference value Sref and it is determined at S180 that the absolute value of the required torque Tp* (required braking force) is greater than the reference value Tref, on the other hand, the CPU 72 determines that the braking force by engine braking does not meet the required braking force and sequentially determines whether the engine rotation speed Ne is a negative value (S210) and whether the engine rotation speed Ne is equal to value 0 (S220). When the engine rotation speed Ne is determined to be neither a negative value nor equal to value 0 but to be a positive value, the CPU 72 sets a torque (negative torque) required for decreasing the rotation speed of the engine 20 to stop the engine 20 to the torque command Tm1* of the motor MG1 (S230). The CPU 72 then sets the torque command Tm2* of the motor MG2, such as to cause the required torque Tp* to be output to the driveshaft 60 (S150), and sends the settings of the torque commands Tm1* and Tm2* (S160).

When the engine 20 is stopped, the engine rotation speed Ne is determined to be equal to value 0 at S220. The CPU 72 then sends a cam phase changeover command to the engine ECU 21 (S240). When receiving the cam phase changeover command, the engine ECU 21 drives and controls the cam drive actuator 30, so as to change over the phases of the cams 28 and 38 relative to the cam shafts 29 and 39 from the phases for normal rotation to the phases for reverse rotation. Until completion of the changeover of the phases of the cams 28 and 38, the CPU 72 sets value 0 to the torque command Tm1* of the motor MG1 (S250 and S260) and sets the torque command Tm2* of the motor MG2, such as to cause the required torque Tp* to be output to the driveshaft 60 (S150), and sends the settings of the torque commands Tm1* and Tm2* (S160).

When it is determined at S250 that the phase changeover is completed, the CPU 72 sends a load operation command to the engine ECU 21, in order to operate the engine 20 by load operation in the reverse rotating direction (S270) and sets a torque required for transmission of the power in the reverse rotating direction from the engine 20 to the driveshaft 60 to the torque command Tm1* of the motor MG1 (S280). The CPU 72 then sets the torque command Tm2* of the motor MG2, such as to cause the required torque Tp* to be output to the driveshaft 60 (S150), and sends the settings of the torque commands Tm1* and Tm2* (S160). As described above, at the shift position SP that is either the B position or the S position, when the required braking force is greater than the reference value Tref, the power in the reverse rotating direction from the engine 20 is output as the braking force to the driveshaft 60 by load operation of the engine 20 in the reverse rotating direction.

Figure 7:
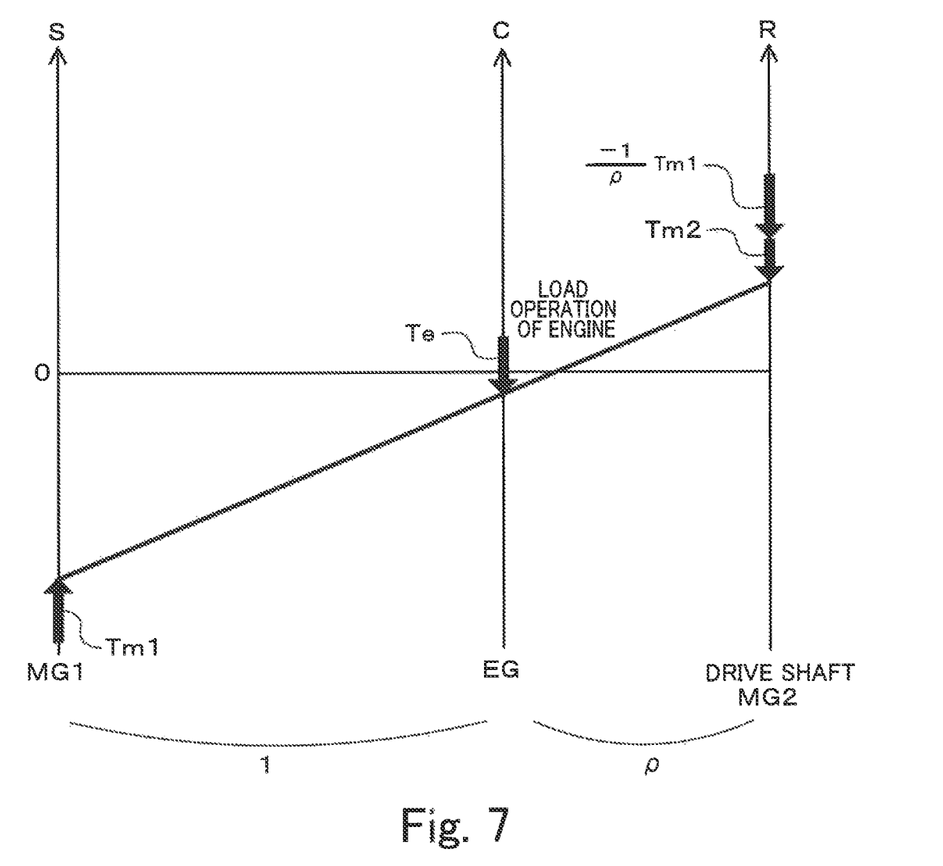
FIG. 7 is a collinear diagram illustrating a dynamic relationship between rotation speed and torque with regard to the respective rotational elements of the planetary gear during deceleration driving by load operation of the engine in a reverse rotating direction.

FIG. 7 is a collinear diagram illustrating a dynamic relationship between the rotation speed and the torque with regard to the respective rotational elements of the planetary gear 40 during deceleration driving by load operation of the engine 20 in the reverse rotating direction. Thick arrows on the axis R indicate a braking torque (−Tm1/ρ) that is applied to the driveshaft 60 by the torque output from the motor MG1 and a braking torque Tm2 output from the motor MG2. As illustrated, in the state of load operation of the engine 20 in the reverse rotating direction, the motor MG1 is controlled to output a positive torque as a reactive force of the engine torque. This enables the power of the engine 20 in the reverse rotating direction to be output as the braking force to the driveshaft 60. In this state, the motor MG1 outputs a positive torque Tm1 with a negative rotation speed and thereby generates electric power, while the motor MG2 generates electric power by regenerative control. The battery 50 is accordingly charged with the electric power generated by both the motors MG1 and MG2. According to this embodiment, the engine 20 is operated by load operation in the reverse rotating direction, as long as the state of charge SOC of the battery 50 is determined to be equal to or less than the reference value Sref at S160. This configuration suppresses the battery 50 from being overcharged.

Figure 8:
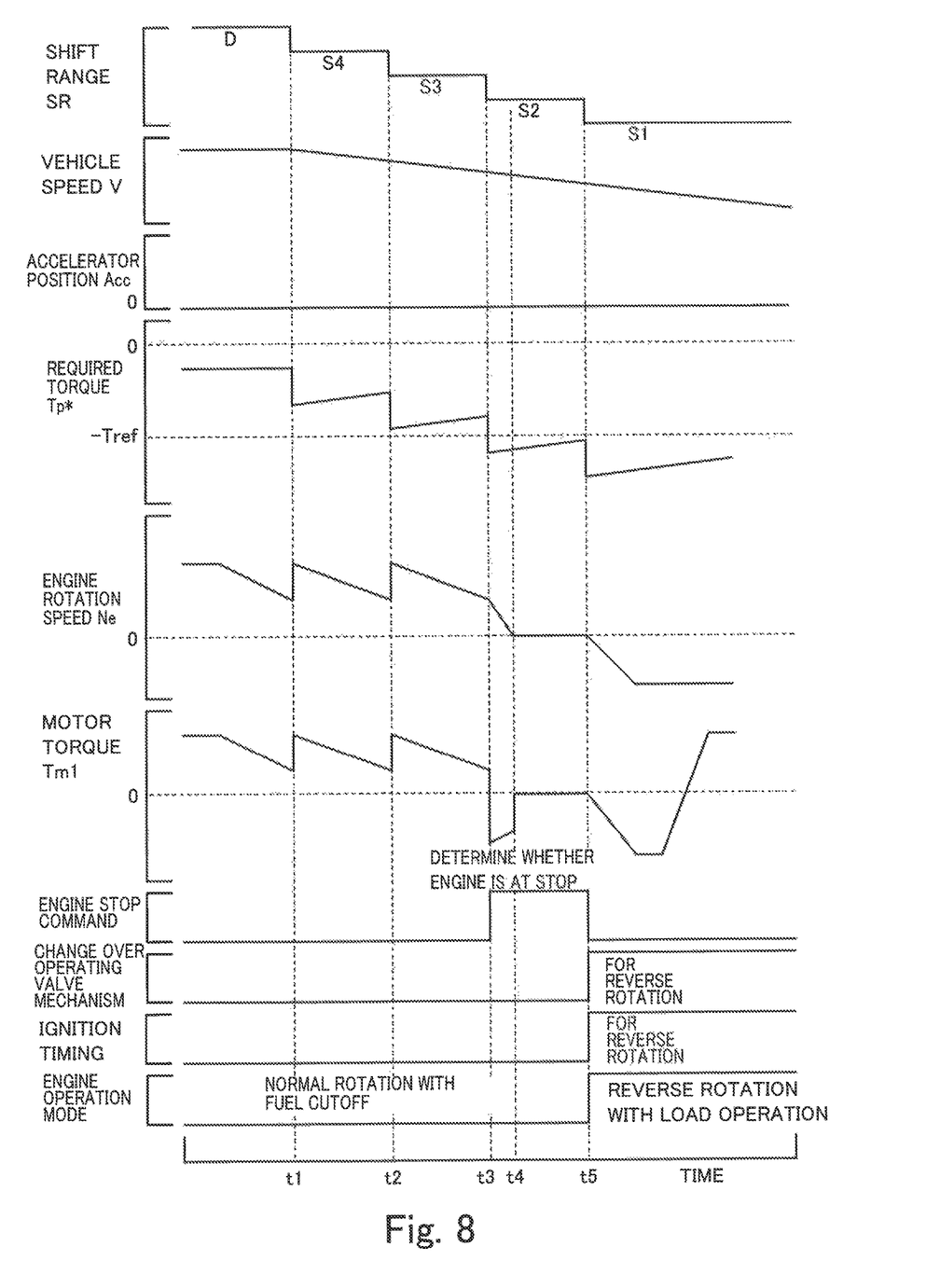
FIG. 8 is a diagram illustrating time changes in the operation conditions of the hybrid vehicle during deceleration driving in an accelerator-off state.

FIG. 8 is a diagram illustrating time changes in the operating conditions of the hybrid vehicle 10 during deceleration driving in the accelerator-off state. As illustrated, it is assumed that the driver changes the gear from the D position to the S position during deceleration driving in the accelerator-off state. With regard to the S position, the required braking force decreases (i.e., the required torque Tp* increases) in the sequence of the S1 position, the S2 position, the S3 position and the S4 position. In the case of a shift operation from the D position to the S4 position at time t1 or in the case of a shift operation from the S4 position to the S3 position at time t2, the required torque Tp* is equal to or greater than a reference value (−Tref) (i.e., the required braking force is equal to or less than the reference value Tref). Accordingly, the braking force by engine braking is output to the driveshaft 60 by motoring of the engine 20 by the motor MG1 in the state that fuel supply to the engine 20 is stopped. In the case of a shift operation from the S3 position to the S2 position at time t3, the required torque Tp* becomes less than the reference value (−Tref), (i.e., the required braking force becomes greater than the reference value Tref), so that the braking force by engine braking becomes insufficient to meet the required braking force. Accordingly, after the motor MG1 is controlled to decrease the rotation speed of the engine 20 and eventually stop the engine 20, the phases of the cams 28 and 38 are changed over from the phases for normal rotation to the phases for reverse rotation at time t4. When the changeover of the phases of the cams 28 and 38 is completed at time t5, the engine 20 is operated by load operation by cranking of the engine 20 in the reverse rotating direction by the motor MG1. This causes the power of the engine 20 in the reverse rotating direction to be output as the braking force to the driveshaft 60 and ensures the braking force that meets the required braking force.

In the hybrid vehicle 10 of the embodiment described above, when the required braking force that is to be output to the driveshaft 60 in the accelerator-off state is equal to or less than the reference value Tref, motoring of the engine 20 by the motor MG1 causes the braking force by engine braking to be output to the driveshaft 60. When the required braking force is greater than the reference value Tref, on the other hand, the negative power output from the engine 20 by load operation of the engine 20 in the reverse rotating direction is output as the braking force to the driveshaft 60. This configuration further ensures output of the required braking force that is to be output to the driveshaft 60. Additionally, when the state of charge SOC is equal to or greater than the reference value Sref, irrespective of the required braking force (absolute value of the required torque Tp*) that is equal to or greater than the reference value Tref, the braking force by engine braking is output to the driveshaft 60. This suppresses the battery 50 from being overcharged.

According to the embodiment, when the gearshift 81 is operated to the B position or the S position and the required braking force becomes greater than the reference value Tref, the engine 20 is controlled to be operated by load operation in the reverse rotating direction by the motor MG1. According to a modification, however, the similar control may be performed when the required braking force becomes greater than the reference value Tref even at the gearshift 81 that is the D position.

Figure 9:
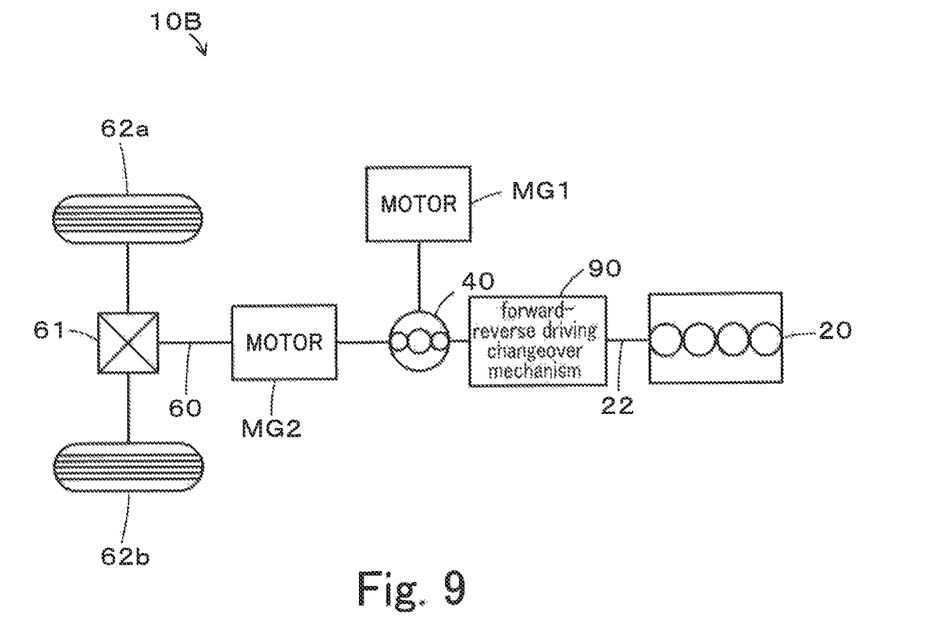
FIG. 9 is a configuration diagram illustrating the schematic configuration of a hybrid vehicle according to a modification.

According to the embodiment, the power in the reverse rotating direction is output as the braking force to the driveshaft 60 by load operation of the engine 20 in the reverse rotating direction. According to a modification, however, the engine 20 may be operated by load operation in the normal rotating direction, while the direction of the power output from the engine 20 may be changed over by using a forward-reverse driving changeover mechanism. FIG. 9 is a configuration diagram illustrating the schematic configuration of a hybrid vehicle 10B according to a modification. As illustrated, the hybrid vehicle 10B of the modification includes a forward-reverse driving changeover mechanism 90 that is placed between a crankshaft 22 of an engine 20 and a carrier of a planetary gear 40 and is comprised of, for example, a planetary gear mechanism, clutches and brakes. In this modification, the braking force by engine braking may be output to the driveshaft 60 by changeover of the forward-reverse driving changeover mechanism 90 to the normal rotating direction and motoring of the engine 20 by the motor MG1 in the state that fuel supply to the engine 20 is stopped. The power from the engine 20 may be output as the braking force to the driveshaft 60 by changeover of the forward-reverse driving changeover mechanism 90 to the reverse rotating direction and load operation of the engine 20 in the normal rotating direction.

According to the embodiment, when the state of charge SOC is equal to or greater than the reference value Sref, irrespective of the required braking force that is equal to or greater than the reference value Tref, the braking force by engine braking is output to the driveshaft 60. According to a modification, however, when the required braking force is equal to or greater than the reference value Tref and the state of charge SOC is equal to or greater than the reference value Sref, the power in the reverse rotating direction from the engine 20 may be output as the braking force to the driveshaft 60 only for a predetermined time period.

The following describes the correspondence relationship between the primary components of the embodiment and the primary components of the present disclosure described in Summary. The engine 20 of the embodiment corresponds to the "engine", the motor MG1 corresponds to the "first motor", the planetary gear 40 corresponds to the "planetary gear mechanism", the motor. MG2 corresponds to the "second motor", and the battery 50 corresponds to the "secondary battery" of the disclosure. The CPU 72 of the HVECU 70 that performs the accelerator-off state control routine of FIG. 4 corresponds to the "braking controller" of the disclosure.

As described above, the present disclosure is directed to a hybrid vehicle. The hybrid vehicle includes an engine, a first motor, a planetary gear mechanism configured to include a first rotational element, a second rotational element and a third rotational element that are arranged in this sequence on a collinear diagram, such that the first rotational element is connected with a rotating shaft of the first motor, the second rotational element is connected with an output shaft of the engine, and the third rotational element is connected with a driveshaft that is linked with an axle, a second motor configured to cause power to be input from and output to the driveshaft, and a secondary battery configured to transmit electric power to and from the first motor and the second motor, wherein power is output from the engine to the second rotational element both in a normal rotating direction and in a reverse rotating direction. The hybrid vehicle further includes a braking controller configured to perform braking control when a required braking force that is to be output to the driveshaft is greater than a predetermined braking force. The braking control controls the engine and the first motor such as to cause a power in the reverse rotating direction to be output from the engine to the second rotational element and to be transmitted to the driveshaft, while controlling the second motor such as to cause the required braking force to be output to the driveshaft.

The braking controller may be configured to perform the braking control, when the required braking force that is to be output to the driveshaft is greater than a predetermined value and the state of charge that indicates a ratio of the amount of charge accumulated in the secondary battery to the total capacity is equal to or less than a predetermined ratio. The hybrid vehicle may further include a shift operation detector configured to detect a shift operation. The braking controller may be configured to perform the braking control in response to detection of a shift operation to a specified range that requires output of a larger braking force than the braking force required in a drive range in an accelerator-off state.

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the hybrid vehicle and so on.

The invention claimed is:

1. A hybrid vehicle, comprising an engine; a first motor; a single pinion-type planetary gear mechanism configured to include a sun gear connected with a rotating shaft of the first motor, a carrier connected with an output shaft of the engine, and a ring gear connected with a driveshaft that is linked with an axle; a second motor configured to cause power to be input from and output to the driveshaft; and a battery configured to transmit electric power to and from the first motor and the second motor, wherein torque is output from the engine to the carrier both in a normal rotating direction and in a reverse rotating direction, the hybrid vehicle further comprising:
a braking controller configured to perform braking control when a required braking force that is to be output to the driveshaft is greater than a predetermined braking force, wherein the braking control controls the engine and the first motor to apply a torque in the reverse rotating direction from the engine to the carrier and thereby reversely rotate the carrier with applying a torque in the normal rotating direction from the first motor to the sun gear, such as to cause a braking force to be output to the driveshaft, while controlling the second motor such as to cause the required braking force to be output to the driveshaft.

2. The hybrid vehicle according to claim 1, wherein the braking controller is configured to perform the braking control, when the required braking force that is to be output to the driveshaft is greater than a predetermined value and the state of charge that indicates a ratio of the amount of charge accumulated in the battery to the total capacity is equal to or less than a predetermined ratio.

3. The hybrid vehicle according to claim 1, further comprising:
a shift operation detector configured to detect a shift operation, wherein
the braking controller is configured to perform the braking control in response to detection of a shift operation to a specified range that requires output of a larger braking force than the braking force required in a drive range in an accelerator-off state.

* * * * *